United States Patent [19]
Kearns

[11] Patent Number: 5,477,619
[45] Date of Patent: Dec. 26, 1995

[54] TAPE MEASURE MARKING ATTACHMENT

[76] Inventor: Richard J. Kearns, 539 Lemon St., North, Hudson, Wis. 54016

[21] Appl. No.: 276,023

[22] Filed: Jul. 15, 1994

[51] Int. Cl.⁶ .............................. B25H 7/04; G01B 3/10
[52] U.S. Cl. ................. 33/668; 33/768; 33/27.03
[58] Field of Search ............... 33/668, 759, 760, 33/761, 768, 770, 27.03; 15/443, 438; 401/6, 7, 8

[56] References Cited

U.S. PATENT DOCUMENTS

| | | | |
|---|---|---|---|
| D. 336,443 | 6/1993 | Dickey | D10/74 |
| 1,419,257 | 6/1922 | Harrigan | 15/443 |
| 1,613,676 | 1/1927 | Raphael | 33/770 |
| 2,053,300 | 9/1936 | Roberts | 15/438 |
| 2,621,409 | 12/1952 | Dvorak | 33/27 |
| 2,807,886 | 10/1957 | Aciego | 33/760 |
| 3,120,059 | 2/1964 | Quenot | 33/27 |
| 3,148,455 | 9/1964 | Aciego | 33/668 |
| 3,262,211 | 7/1966 | Beckett | 33/668 |
| 3,336,678 | 8/1967 | Chamberlain et al. | 33/668 |
| 3,393,454 | 7/1968 | Creighton | 33/27 |
| 3,526,964 | 9/1970 | Clark, Jr. | 33/27 |
| 3,731,389 | 5/1973 | King | 33/189 |
| 3,802,083 | 4/1974 | Freed | 33/668 |
| 3,972,628 | 8/1976 | Stevers | 15/443 |
| 4,015,337 | 4/1977 | Taylor | 33/138 |
| 4,023,277 | 5/1977 | Fizer | 33/27 |
| 4,030,841 | 6/1977 | Balasty | 401/6 |
| 4,103,426 | 8/1978 | Robin | 33/27 |
| 4,547,973 | 10/1985 | Owens | 33/27 |
| 4,760,648 | 8/1988 | Doak et al. | 33/668 |
| 4,914,830 | 4/1990 | Legare | 33/668 |
| 4,964,225 | 10/1990 | Waldherr | 33/768 |
| 4,976,037 | 12/1990 | Hines | 33/27.03 |
| 5,056,945 | 10/1991 | Klodt | 401/6 |
| 5,154,006 | 10/1992 | Wooster | 33/668 |
| 5,172,486 | 12/1992 | Waldherr | 33/770 |
| 5,295,308 | 3/1994 | Stevens et al. | 33/668 |

*Primary Examiner*—Thomas B. Will
*Attorney, Agent, or Firm*—Nawrocki, Rooney & Sivertson

[57] ABSTRACT

A marking attachment for use with a tape measure. The marking attachment includes a generally cylindrically shaped housing for holding a marking utensil. A mechanism is included integral with the housing for releasably locking the marking utensil within the housing. The marking attachment further includes a mechanism extending from the housing for use as a guide to determine a desired measurement. The marking attachment housing may include a mechanism for attaching the marking attachment to a tape measure, or alternatively, the marking attachment may be formed integrally with the housing.

7 Claims, 2 Drawing Sheets

TAPE MEASURE MARKING ATTACHMENT

FIELD OF THE INVENTION

The present invention relates to tape measures. In particular, the present invention relates to a tape measure marking apparatus, for use with a conventional tape measure device, for measuring and marking surfaces.

BACKGROUND OF THE INVENTION

Conventional tape measures are used for measuring and marking by most trades. A conventional tape measure typically includes a housing, a measuring tape, a tape locking device, and a belt clip. The measuring tape is located within the tape measure housing and extends from the housing for making a desired measurement. The locking device locks the tape in an extended position. The belt clip allows the conventional tape measure to be attached to a standard belt, ready for use.

Conventional tape measures include a metal extension located on the end of the measuring tape to aid in making measurements. In operation, the metal extension catches an edge of the surface to be measured, and the measuring tape is extended from the tape measure housing by moving the tape measure across the surface to be measured. In order to mark the measured surface, the user must have both hands free, one for operating the tape measure and the other hand for marking the surface with a marking utensil.

Due to the nature of the construction business, often it is very time consuming and problematic to have both hands available for making a desired measurement. Tape measure marking attachments have been developed to solve this problem. Although useful, past tape measure marking attachments have proved to be unflexible, not easily adaptable to conventional tape measures, or expensive to manufacture.

One such tape measure marking attachment suggests a fixture for use with a tape measure for measuring and marking straight line measurements and scribing arcs around a fixed. point. The fixture is located at the end of the tape measure tape and has provisions for establishing a center point on a surface, while protecting the surface from the metal edge located at the end of the tape. A clip is located on the side of the tape measure housing for positioning a pencil or other marking utensil in a predetermined location for scribing straight lines and arcs. The clip has a front pencil holder and a rear pencil holder, and is positioned on one side of the tape measure housing. A pencil is located in the pencil holder, and is secured against the side of the tape measure housing by securing the clip to the tape measure housing using a fastener such as a screw.

In the above invention, in order to remove the marking utensil from the tape measure, the attachment clip must be unscrewed from the tape measure housing. Additionally, the tape measure attachment clip is secured to the tape measure housing at the center of the tape measure. This is typically where the tape measure belt clip is located. In order to use the tape measure attachment clip, the tape measure belt clip must be removed from the tape measure housing.

Yet another tape measure marking apparatus includes a conventional tape measure having a radius point, an indicating window, and a marking hole. The marking hole is located at the end of the tape. The radius point extends from the bottom of the tape measure. Upon fixing the radius point, the tape may be extended to a desired radius, which is indicated in the indicating window, and marked by inserting a pencil through the marking hole at the end of the tape.

Although the above invention may function for use as a compass, it does not lend itself for marking most measurements commonly made with a conventional tape measure. Since the marking device is located at the end of the measuring tape, one-handed measurements are not easily made since in a typical measuring operation, the end of the measurement tape is fixed, and it is desired to mark the surface to be measured at a location near the tape measure housing.

Other tape measure marking apparatus suggest using attachments which may be adjustably located edgewise on a steel tape of a conventional tape measure. The attachments may hold a scribing pin, or alternatively, they may hold a pencil or chalk, to be used for scribing measurements and scribing arcs. Such an attachment does not lend itself to normal tape measure use, where the tape measure lies flat on the measuring surface.

Another tape measure marking device suggest a combined tape measure and marking device. The marking device is located within the tape measure housing. When a desired surface is measured, the marking device is actuated resulting in a mark being located on the measured surface. Such a device is not adaptable to conventional tape measures, and requires that a separate marking device be located within the tape measure housing.

None of the above tape measure marking attachments are easily adaptable to a conventional tape measure housing, while providing an effective and efficient means for marking measurements with one hand, nor do the devices provide for easy removal of the marking utensil to be used elsewhere.

SUMMARY OF THE INVENTION

The present invention is a tape measure apparatus. The tape measure apparatus includes a marking attachment which is adapted for use with a conventional tape measure device for measuring and marking surfaces.

The tape measure apparatus includes a housing and a measuring tape. The measuring tape is located within the housing, the measuring tape being extendable from the housing. Means integral the housing are included for holding a marking utensil. Additionally, means integral the housing are included for releasably locking the marking utensil in the holding means.

Additionally, the tape measure marking apparatus includes means extending from the housing for use as a guide to determine a desired measurement. The guide means extends across the measuring tape when it is extended from the tape measure.

In one embodiment, the holding means is formed of molded plastic integral the tape measure housing. The holding means is generally cylindrically shaped and is sized to accept the holding utensil.

The locking means may include the marking utensil being locked in place by friction. Alternatively, the locking means may include the generally cylindrically shaped holding means being out-of-round. A multi-sided marking utensil may be twist locked into place within the holding means. The locking means may also include a tang carried at the bottom end of the holding means.

In one embodiment, the present invention includes a marking apparatus for use with a conventional tape measure. The marking apparatus includes a housing which is generally cylindrically shaped. The housing is for holding a marking utensil. Means integral the housing are included for releasably locking the marking utensil within the apparatus housing.

The marking apparatus may further include means extending from the housing for use as a guide to determine a desired measurement. The guide means extends across the tape when it is extended from the tape measure.

Additionally, the marking apparatus includes means carried by the housing for attaching the marking apparatus to a tape measure. In one embodiment, the tape measure includes side screws, wherein the attaching means secures the marking apparatus to the tape measure using at least one existing tape measure side screw.

When the marking apparatus is attached to a tape measure, the tape measure may be used as a compass.

The marking apparatus locking means may include the generally cylindrically shaped housing being out-of-round, or the marking utensil may be locked in place in the housing by friction. Alternatively, the locking means may include a tang being located at the bottom of the cylindrically shaped housing.

The present invention allows a conventional tape measure user to mark measurements or scribe circles using only one hand. The present invention may be formed integral the tape measure housing, or alternatively, may be adapted for use with a conventional tape measure. The present invention includes a novel, releasable locking mechanism whereby a marking utensil is easily locked within the mechanism for use.

BRIEF DESCRIPTION OF THE DRAWING

Other objects of the present invention and many of the attendant advantages of the present invention will be readily appreciated as the same becomes better understood by reference to the following detailed description when considered in connection with the accompanying drawings in which like reference numerals designate like parts throughout the figures thereof, and wherein.

DETAILED DESCRIPTION OF THE PREFERRED EMBODIMENTS

The present invention is a tape measure apparatus. The tape measure apparatus includes a marking attachment which is adapted for use with a conventional tape measure device for measuring and marking surfaces. The tape measure attachment is easily adaptable to a conventional tape measure housing, while providing an effective and efficient means for marking measurements with one hand. Additionally, the tape measure marking attachment provides for easy removal of a marking utensil for use.

Figure 1:
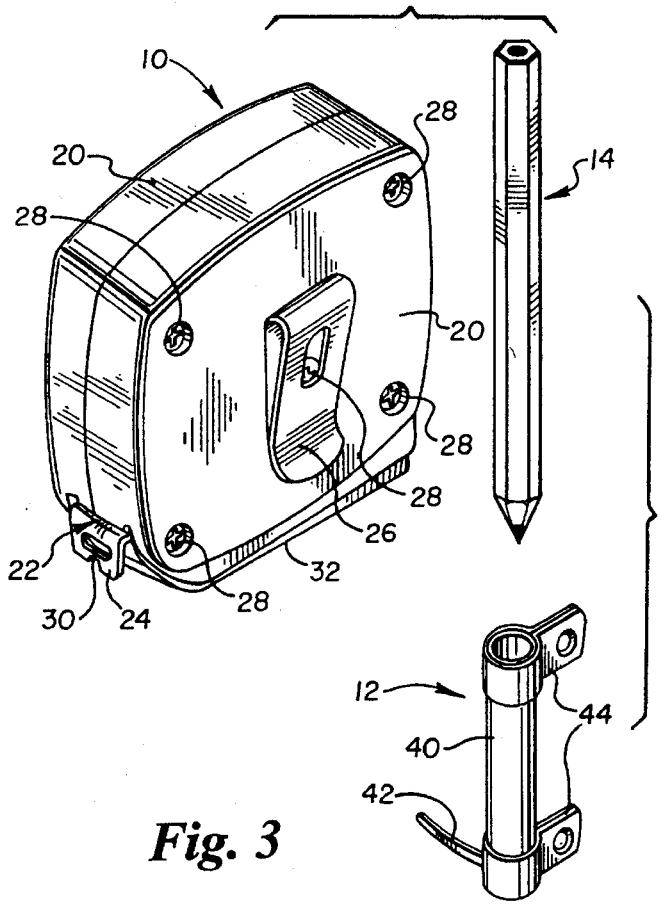
FIG. 1 is an exploded perspective view of an embodiment of the present invention with a conventional tape measure tape and marking utensil.
Figure 2:
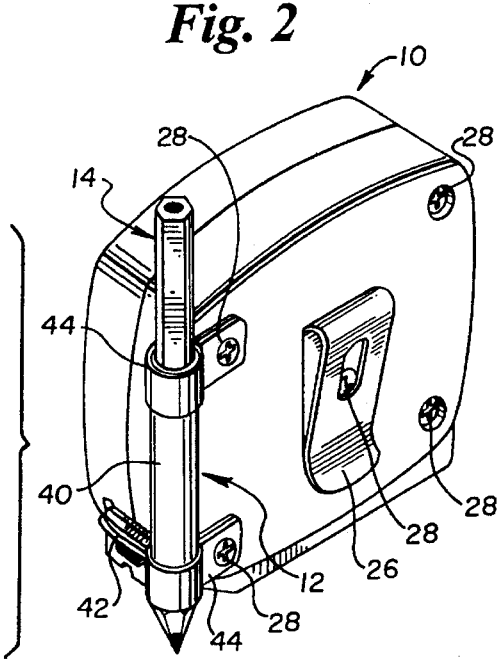
FIG. 2 is a perspective view showing the subjects of FIG. 1 in assembly.

FIGS. 1 and 2 show a conventional tape measure generally at 10, with a tape measure marking attachment shown at 12, and a marking utensil shown at 14. FIG. 1 is an exploded perspective view showing the tape measure 10, the tape measure marking attachment 12, and the marking utensil 14. FIG. 2 is a perspective view showing the elements of FIG. 1 in assembled form.

Tape measure 10 includes a housing 20, a tape 22 (partially shown), a metal clip 24, belt clip 26, and side screws 28. Tape 22 is contained within housing 20. In operation, tape 22 is extended from housing 20 for making a desired measurement. The edge clip 24 is located at the end of tape 22 for aiding in making measurements by catching the end of the tape on the edge of a surface. Additionally, edge clip 24 includes a hole 30 for catching the edge clip 24 on a nail head. When tape 22 is extended from housing 20, a locking device 32 locks tape 20 in an extended position.

Housing 20 is made of any commonly used material in the art, such as molded plastic or metal. Side screws 28 secure housing 20 together surrounding tape 22. Additionally, a side screw 28 secures the belt clip 26 to the housing 20. The belt clip 26 is useful in temporarily storing the tape measure on a person's belt, freeing their hands, while being readily accessible for use. It is recognized that the tape measure marking attachment 12 may be formed from separate pieces, or may be formed in one molded piece.

In one embodiment of the present invention, the tape measure marking attachment 12 includes a holder 40, a site guide 42, and a pair of brackets 44.

As shown in FIG. 2, holder 40 is generally cylindrically shaped for receiving marking utensil 14. Brackets 44 secure the tape measure marking attachment 12 to housing 20. Specifically, brackets 44 are designed for attaching tape measure marking attachment 12 to a conventional tape measure housing 20. The brackets 44 are secured to the housing 20 using existing side screws 28.

Site guide 42 extends across the measuring tape 22. Site guide 42 is in direct alignment with marking utensil 14. When tape 22 is extended from the housing 20, site guide 42 is aligned with the desired measurement on tape 22 for marking.

Figure 3:
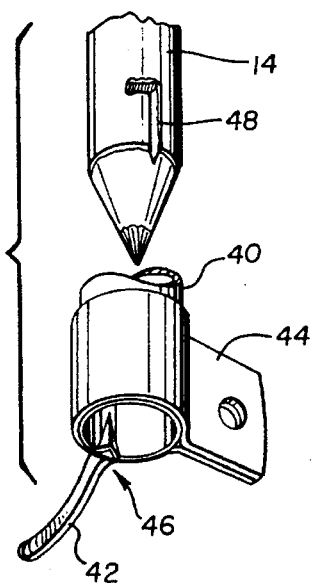
FIG. 3 is a fragmentary perspective view of an alternative embodiment of the present invention.

After marking utensil 14 is inserted into tape measure marking attachment 12, it is locked into place. In one embodiment shown in FIG. 3, the locking mechanism is shown generally at 46. In his embodiment, the locking mechanism 46 includes a tang located at the bottom of holder 40. Marking utensil 14 is generally cylindrical. In operation, marking utensil 14 is inserted into holder 40. Marking utensil 14 is twisted a partial turn, locking marking utensil 14 in place. A groove left by locking mechanism 46 is shown generally at 48. The novel locking system of the present invention is adaptable to many commonly used marking utensils, and securely retains the marking utensil in place for marking measurements.

Figure 4:
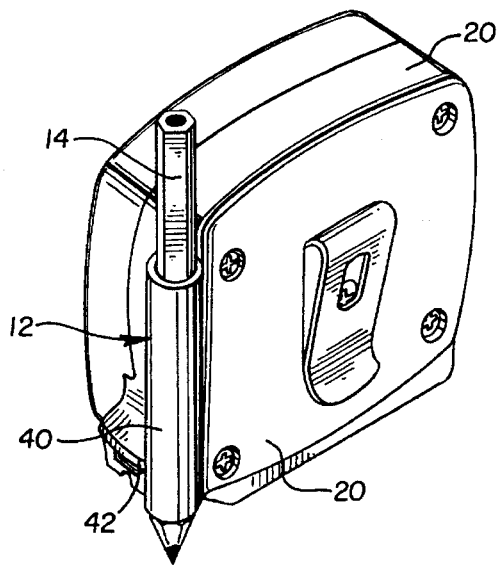
FIG. 4 is a perspective view of the preferred embodiment of the present invention.

FIG. 4 shows another embodiment of the present invention. In this embodiment tape measure marking attachment is integrally molded with housing 20, eliminating the need for brackets. Additionally, the molded tape measure having an integral tape measure marking attachment is well suited for efficient mass manufacturing processes. Marking utensil 14 fits within generally cylindrically shaped holder 40. The marking utensil 14 is multi-sided, such as a pencil. The inside of holder 40 is also multi-sided, and slightly larger than marking utensil 14.

Marking utensil 14 may be securely locked within holder 40. The marking utensil 14 is simply inserted within holder 40, and twisted a partial turn, locking the marking utensil 14 in place. If the marking utensil is needed elsewhere, the locking process is reversed.

Figure 5:
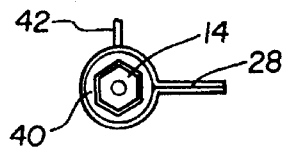
FIG. 5 is a fragmentary top plan view of a marking utensil inserted into the present invention.
Figure 6:
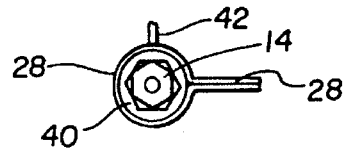
FIG. 6 is a fragmentary view showing the marking utensil in a locked position within the present invention.

FIG. 5 is a fragmentary top plan view showing a marking utensil 14, such as a pencil, inserted within tape measure marking attachment 12. The interior surface of holder 40 is multi-sided, similar to that of marking utensil 14, but slightly larger, for receiving marking utensil 14. FIG. 6 is a fragmentary top plan view of the tape measure marking attachment 12, showing the marking utensil 14 locked within the holder 40. To lock marking utensil 14 within holder 40, the marking utensil 14 is simply inserted within holder 40, and twisted a partial turn.

The novel locking mechanism of the present invention securely locks the marking utensil within the tape measure marking attachment. If one desires to remove the marking utensil, the process is simply reversed. No additional pieces, such as traditional set screws or other locking devices, are necessary.

Figure 7:
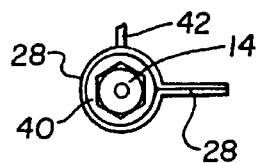
FIG. 7 is a fragmentary view showing a round marking device inserted into the present invention.

FIG. 7 is a fragmentary top plan view showing a round. marking utensil locked within the holder 40. In this embodiment, the marking utensil 14 is simply inserted into holder 40 and locked by friction. Alternatively, a tang located at the bottom of holder 40 may be used as a locking mechanism for aiding and locking the marking utensil 14 in place.

Figure 8:
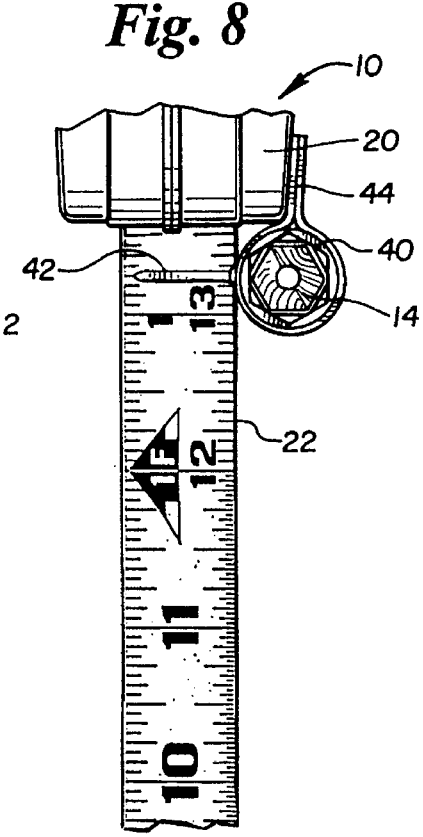
FIG. 8 is a fragmentary top plan view of the present invention with a portion of measuring tape extended from the housing.

FIG. 8 is a fragmentary top plan view showing the present invention with tape 22 extended from housing 20 of the tape measure 10. The tape measure marking attachment 12 is securely attached to housing 20, and marking utensil 14 is locked within holder 40.

Site guide 42 is aligned with marking utensil 14, and extends partially across tape 22. In operation, tape 22 is extended from housing 20 until site guide 42 aligns on tape 22 with the desired measurement to be marked. Since marking utensil 14 is aligned with site guide 42, site guide 42 indicates the marked measurement.

Figure 9:
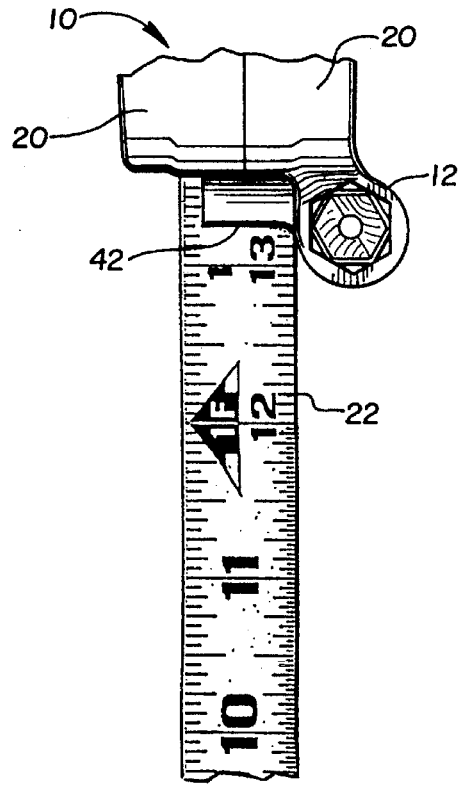
FIG. 9 is a top plan view similar to that of FIG. 8 showing the preferred embodiment.

FIG. 9 shows a fragmentary top plan view similar to that of FIG. 8 showing an alternative embodiment of the present invention. The tape measure marking attachment 12 is molded integral the housing 20. The site guide 42 is also molded integral the tape measure housing 20. Site guide 42 extends partially across tape 22. Site guide 42 is aligned with marking utensil 14, and indicates the desired marked measurement.

Figure 10:
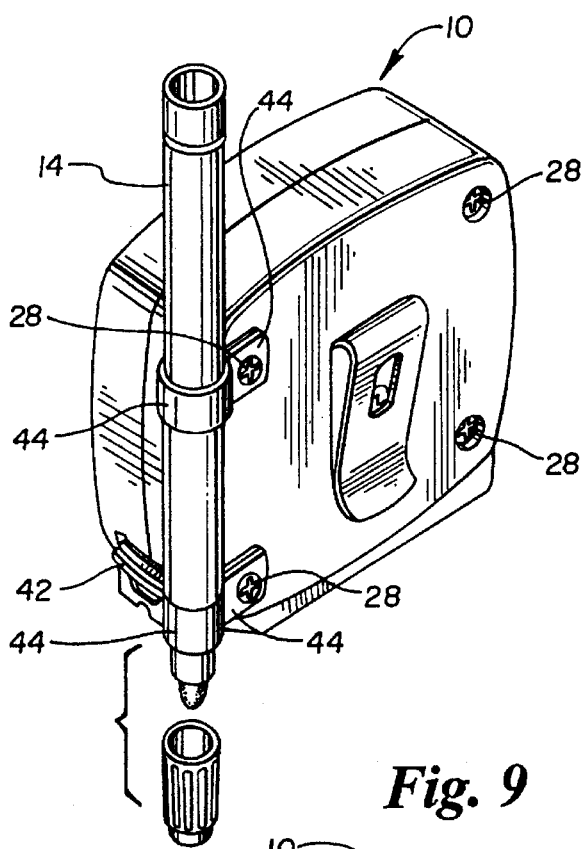
FIG. 10 is a perspective view of another alternative embodiment.

FIG. 10 shows a perspective view of yet another alternative embodiment of the present invention. As shown, the present invention is readily adaptable for use with many different types of marking utensils. The marking utensil 14 shown is a generally cylindrically shaped felt tip marker. The marker may be securely retained within brackets 44 and attached to housing 20 using side screws 28. The tape measure marking attachment 12 is easily adaptable to be securely attached to conventional tape measures, using existing tape measure side screws. Additionally, the tape measure marking attachment of the present invention does not require that belt clip 26 be removed from the tape measure 10 for securing the tape measure marking attachment 12 to the housing 20. Belt clip 26 remains available for attaching the tape measure 10 with tape measure marking attachment to a user's belt.

The tape measure marking attachment of the present invention is easily adaptable to conventional tape measure housings. The tape measure marking attachment provides an effective and efficient means for marking measurements within one hand. Additionally, the marking utensil is simply twist locked in place and may be easily removed for other uses.

The tape measure marking attachment aids the user in making one-handed precise measurements, freeing the other hand for other uses. Additionally, with the tape measure marking attachment, a conventional tape measure may be used as a compass or scribe.

It will be understood that this disclosure is, in many respects, only illustrative. Changes may be made in details, particularly in matters of shape, size, material, and arrangement of parts, without exceeding the scope of the invention.

For example, the tape measure marking attachment may be attached to either side of the tape measure housing, and may be adapted to be secured to many different commonly used tape measures. Additionally, the tape measure marking attachment may consist of a separate device secured to a conventional tape measure housing, or it may be molded integral the tape measure housing. Additionally, the separate tape measure marking device may be formed from shaped metal, or formed from a molded material such as plastic. Accordingly, the scope of the invention is as defined in the language of the appended claims.

What is claimed is:

1. Marking apparatus for holding a marking utensil for use with a conventional tape measure, the tape measure including a generally rectangular shaped housing having a measuring tape located within the housing, the measuring tape being extendable from the housing, the marking apparatus comprising:

a. a body having a generally cylindrically shaped receptacle for holding a marking utensil;

b. means integral with the body for releasably locking the marking utensil within said body, the locking means including the generally cylindrically shaped receptacle wherein the receptacle is generally sized for receiving the marking utensil, a wall defining the receptacle including a plurality of opposing faces, wherein the marking utensil is releasably locked in place by friction; and c. means extending from the body for securing the marking apparatus to the housing, wherein the marking utensil is generally geometrically shaped having a first diameter which is less than a distance between the receptacle opposing faces, and a second diameter which is greater than a distance between the receptacle opposing faces, and wherein the marking device is releasably twist-locked within the receptacle.

2. The marking apparatus of claim 1, wherein the means for securing the marking apparatus to the housing includes the marking apparatus being integrally molded with the housing.

3. The marking apparatus of claim 1, further comprising means extending from the marking apparatus for demarking a location along the measuring tape which the marking utensil will mark.

4. The marking apparatus of claim 3, wherein the means extending from the marking apparatus for demarking a location along the measuring tape extends across the tape when the tape is extended from the tape measure housing.

5. The marking apparatus of claim 1, the tape measure including side screws, wherein the means extending from the body for securing the marking apparatus to the housing utilizes at least one side screw.

6. The marking apparatus of claim 1, wherein when the measuring tape is extended from the tape measure, the marking apparatus may be used as compass.

7. The marking apparatus of claim 1, wherein the receptacle has a bottom end and a top end, and wherein an internally directed tang is carried by the receptacle proximate the bottom end to aid in twist-locking the marking device in place.

* * * * *